United States Patent
Li et al.

(10) Patent No.: US 10,205,363 B2
(45) Date of Patent: Feb. 12, 2019

(54) LOCATING STRUCTURE BETWEEN PRINTED CIRCUIT BOARD AND INSULATING BOBBIN IN A BRUSHLESS MOTOR

(71) Applicant: Bergstrom, Inc., Rockford, IL (US)

(72) Inventors: Gengxiang Li, Changzhou (CN); Lei Wang, Changzhou (CN); Kuilin Yang, Changzhou (CN)

(73) Assignee: Bergstrom, Inc., Rockford, IL (US)

( * ) Notice: Subject to any disclaimer, the term of this patent is extended or adjusted under 35 U.S.C. 154(b) by 242 days.

(21) Appl. No.: 15/210,558

(22) Filed: Jul. 14, 2016

(65) Prior Publication Data
US 2017/0018998 A1    Jan. 19, 2017

(30) Foreign Application Priority Data
Jul. 16, 2015 (CN) .......................... 2015 1 0419131

(51) Int. Cl.
*H02K 1/00* (2006.01)
*H02K 3/52* (2006.01)
*H02K 5/22* (2006.01)
*H02K 3/28* (2006.01)

(52) U.S. Cl.
CPC ............... *H02K 3/525* (2013.01); *H02K 3/28* (2013.01); *H02K 5/225* (2013.01); *H02K 2203/03* (2013.01); *H02K 2203/12* (2013.01)

(58) Field of Classification Search
CPC ............... H02K 5/225; H02K 2201/03; H02K 2203/12; H02K 11/0094; H02K 11/30
USPC ................................ 310/194, 214, 71, 91, 43
See application file for complete search history.

(56) References Cited

U.S. PATENT DOCUMENTS

| | | | |
|---|---|---|---|
| 6,021,043 A | 2/2000 | Horng | |
| 6,072,261 A | 6/2000 | Lin | |
| 6,232,687 B1 | 5/2001 | Hollenbeck et al. | |
| 6,992,419 B2 | 1/2006 | Kim et al. | |
| 7,135,799 B2 | 11/2006 | Rittmeyer | |
| 7,385,323 B2 | 6/2008 | Takahashi et al. | |
| 7,663,285 B2 * | 2/2010 | Yumoto ................. | H02K 3/522 310/194 |

(Continued)

FOREIGN PATENT DOCUMENTS

| CN | 101764448 A | 6/2010 |
|---|---|---|
| CN | 202634122 U | 12/2012 |

(Continued)

OTHER PUBLICATIONS

Office Action dated Feb. 28, 2017 from The State Intellectual Property Office of the People's Republic of China in related Chinese application No. 201510419131.8.

(Continued)

*Primary Examiner* — Hanh Nguyen
(74) *Attorney, Agent, or Firm* — Morgan, Lewis & Bockius LLP

(57) ABSTRACT

A brushless motor includes a printed circuit board having a plurality of locating holes therethrough; and an upper insulating bobbin including a plurality of locating bosses distributed along a circumference direction of an upper surface of the upper insulating bobbin. Each locating boss has a locating column projecting from a top surface thereof such that each locating column is inserted into a respective locating hole.

20 Claims, 12 Drawing Sheets

(56) References Cited

U.S. PATENT DOCUMENTS

| | | | |
|---|---|---|---|
| 7,821,175 B2 | 10/2010 | Ionel et al. | |
| 7,932,658 B2 | 4/2011 | Ionel | |
| 7,965,012 B2* | 6/2011 | Murakami | H02K 3/522 |
| | | | 310/194 |
| 8,264,109 B2* | 9/2012 | Wang | H02K 3/50 |
| | | | 310/71 |
| 8,450,898 B2* | 5/2013 | Sears | H02K 3/522 |
| | | | 310/194 |
| 8,492,948 B2 | 7/2013 | Wang et al. | |
| 8,541,924 B2* | 9/2013 | Van Tiem | H02K 3/325 |
| | | | 310/215 |
| 8,841,813 B2 | 9/2014 | Junak et al. | |
| 2007/0103014 A1 | 5/2007 | Sumiya et al. | |
| 2008/0106161 A1* | 5/2008 | Matsuzaki | H02K 3/524 |
| | | | 310/71 |
| 2009/0140590 A1 | 6/2009 | Hung | |
| 2010/0127591 A1 | 5/2010 | Court et al. | |
| 2013/0181556 A1 | 7/2013 | Li et al. | |
| 2015/0354563 A1* | 12/2015 | Takahashi | H02K 3/522 |
| | | | 417/410.4 |

FOREIGN PATENT DOCUMENTS

| | | |
|---|---|---|
| CN | 103401328 A | 11/2013 |
| CN | 203398943 U | 1/2014 |
| CN | 203942360 U | 11/2014 |
| CN | 105071563 A | 11/2015 |
| CN | 105186726 A | 12/2015 |
| CN | 204858884 U | 12/2015 |
| DE | 19942029 A | 3/2001 |
| JP | H07-231637 A | 8/1995 |
| JP | H10-304613 A | 11/1998 |
| JP | 2005033941 A | 2/2005 |

OTHER PUBLICATIONS

Second Office Action dated May 3, 2017 from The State Intellectual Property Office of the People's Republic of China in related Chinese application No. 201510419131.8.

Notification to Grant Patent dated Oct. 11, 2017 from The State Intellectual Property Office of the People's Republic of China in related Chinese application No. 201510419131.8.

International Search Report and Written Opinion issued in related technology International Patent Application No. PCT/US2016/042329 dated Sep. 30, 2016.

International Search Report and Written Opinion issued in related technology International Patent Application No. PCT/US2016/042314 dated Sep. 30, 2016.

International Search Report and Written Opinion issued in related technology International Patent Application No. PCT/US2016/042326 dated Sep. 27, 2016.

International Search Report and Written Opinion issued in counterpart International Patent Application No. PCT/US2016/042307 dated Jul. 10, 2016.

Tyco Electronics Corporation, "MAG-MATE Connector With Multispring Pin," https://datasheet.octopart.com/1247003-2-TE-connectivity-datasheet-14918754.pdf, Jan. 2013.

\* cited by examiner

LOCATING STRUCTURE BETWEEN PRINTED CIRCUIT BOARD AND INSULATING BOBBIN IN A BRUSHLESS MOTOR

The present invention claims the benefit of Chinese Patent Application No. 201510419131.8, filed in the People's Republic of China on Jul. 16, 2015, which is hereby incorporated by reference.

In addition, Chinese Application Nos. 201510420866.2, 201510420136.2, and 201510420854.X, all of which filed on Jul. 16, 2015, are hereby incorporated by reference.

BACKGROUND OF THE INVENTION

Field of the Invention

The present invention relates to a motor, and more particularly, to a brushless motor having a printed circuit board mounted on an insulating bobbin.

Technology Background

A brushless motor is a motor without a brush and a commutator (or collecting ring). A brushless motor operates by changing the alternating frequency and the wave form of a current wave supplied to the winding coil of a stator. Brushless motors are widely used by manufacturers in different sizes because of their high efficiency, low energy consumption, low noise, super long life, high reliability, servo controllability, stepless frequency conversion and speed regulating, low cost, and ease of use.

A brushless motor comprises a casing, a printed circuit board (PCB), a rotor, and a stator. The stator includes an upper insulating bobbin, a stator core, a lower insulating bobbin, and a winding on the stator coils defining a plurality of coils. The upper insulating bobbin and the lower insulating bobbin are installed respectively on the upper end face and the lower end face of the stator core. A lead wire winds the coil wound portion, which is formed by an upper slot insulation on the upper insulating bobbin, a tooth portion of the stator core and a lower slot insulation of the lower insulating bobbin as per a certain rule. Thus, the wound lead wire forms a winding on the stator core. The PCB is installed on the upper insulating bobbin and electrically connected to the stator winding.

However, the present inventors have identified a number of problems regarding existing brushless motors.

For example, the existing brushless motor production process has the PCB secured on the casing first and then assembles the PCB and the upper insulating bobbin by a terminal connecting hole on the PCB and the terminal on the upper insulating bobbin. In actual production, since there are many errors between the positions of the terminal on the upper insulating bobbin relative to the terminal connecting hole on the PCB, production errors may be generated during automatic production process. Another brushless motor production process has the PCB installed on the upper insulating bobbin first and then lead wire of the stator winding is soldered to the PCB. In actual production, the lead wire of the stator winding should be soldered to the PCB manually, and therefore, automated production cannot be realized.

SUMMARY

Accordingly, the present invention is directed to a brushless motor that substantially obviates one or more of the problems due to limitations and disadvantages of the related art.

An object of the present invention is to provide a brushless motor in which mounting alignment errors between a terminal and a terminal connecting hole are avoided when a printed circuit board (PCB) is mounted to an upper insulating bobbin.

Another object of the present invention is to provide a brushless motor that can be easily manufactured.

Another object of the present invention is to provide a brushless motor that can be manufactured in an automated process with high yield.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a brushless motor comprises a printed circuit board having a plurality of locating holes therethrough; and an upper insulating bobbin including a plurality of locating bosses distributed along a circumference direction of an upper surface of the upper insulating bobbin, wherein each locating boss has a locating column projecting from a top surface thereof such that each locating column is inserted into a respective locating hole.

In another aspect, a brushless motor comprises a printed circuit board; and an upper insulating bobbin including a plurality of locating bosses distributed along a circumference direction of an upper surface of the upper insulating bobbin, wherein one of the printed circuit board and the plurality of locating bosses includes a plurality of locating columns respectfully projecting therefrom, wherein the other one of the printed circuit board and the plurality of locating bosses includes a plurality of locating holes, and wherein each locating column is inserted into a respective locating hole.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION

Reference will now be made in detail to embodiments of the present invention, examples of which are illustrated in the accompanying drawings.

As will be described, a locating column is provided on an upper surface of the upper insulating bobbin to be assembled with a locating hole on the printed circuit board (PCB) to realize the accurate positioning between the terminal on the upper insulating bobbin and the terminal connecting hole on the PCB during the automatic assembly of the upper insulating bobbin and the PCB. As a result, positional errors between the terminal connecting hole on the PCB and the terminal on the upper insulating bobbin can be reduced, thereby reducing rejects during automatic production process. Further, by optimizing the design of the height difference h between the top surface of the locating boss and the top surface of the terminal fixing block, the circuit on the PCB can be prevented from being damaged due to the terminal going too deep into the PCB. In addition, discontinuity due to the terminal not go into the PCB completely can be prevented. The end of the locating column that works with the locating hole may be tapered to correct positional errors that may occur during the process of inserting the locating column into the locating hole. Thus, the accuracy of inserting the locating column being into the locating hole can be assured and production efficiency can be improved. Each locating boss may have a wire-through slot for lead wire limiting on its side wall facing the outer edge of the upper insulating bobbin so that the quantity of the wire-through block on the upper insulating bobbin can be reduced and so that the structure of the upper insulating bobbin can be simplified and the production cost can be reduced. Moreover, the wire-through notch of the terminal fixing block on the upper insulating bobbin is located along the circumference direction of the upper insulation bobbin and the terminal socket on the terminal fixing block is located along the radial direction of the upper insulating bobbin. In this way, a puncture notch of the insulation displacement connection terminal is located along the circumference direction of the upper insulating bobbin so that the lead wire can be located along the circumference of the upper surface of the upper insulating bobbin when the stator winding is wound by the lead wire and further the radial dimension of the stator is reduced.

First Embodiment

Figure 1:
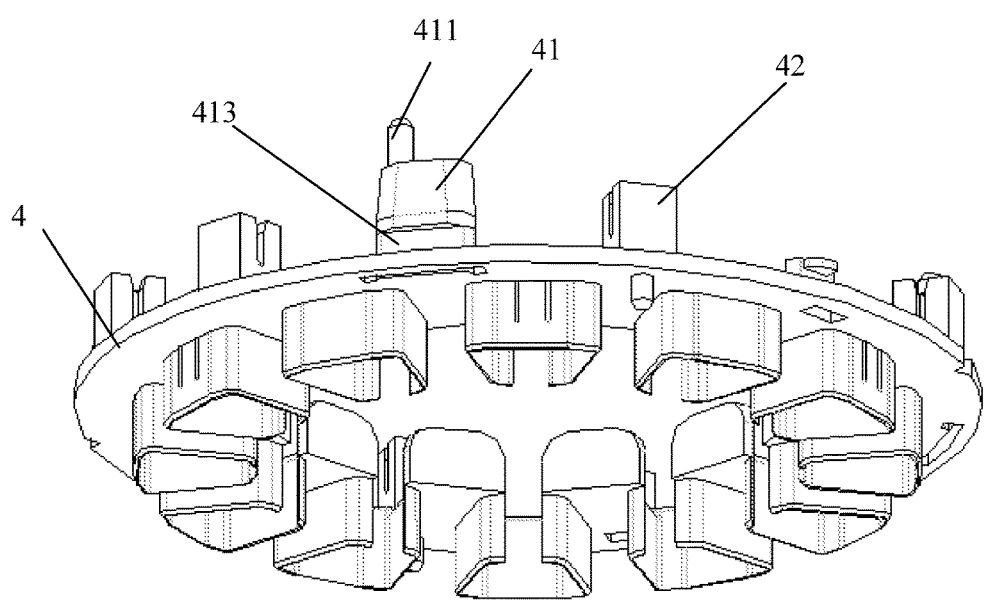
FIG. 1 is a perspective view showing the structure of the upper insulating bobbin according to a first example embodiment of the present invention.
Figure 2:
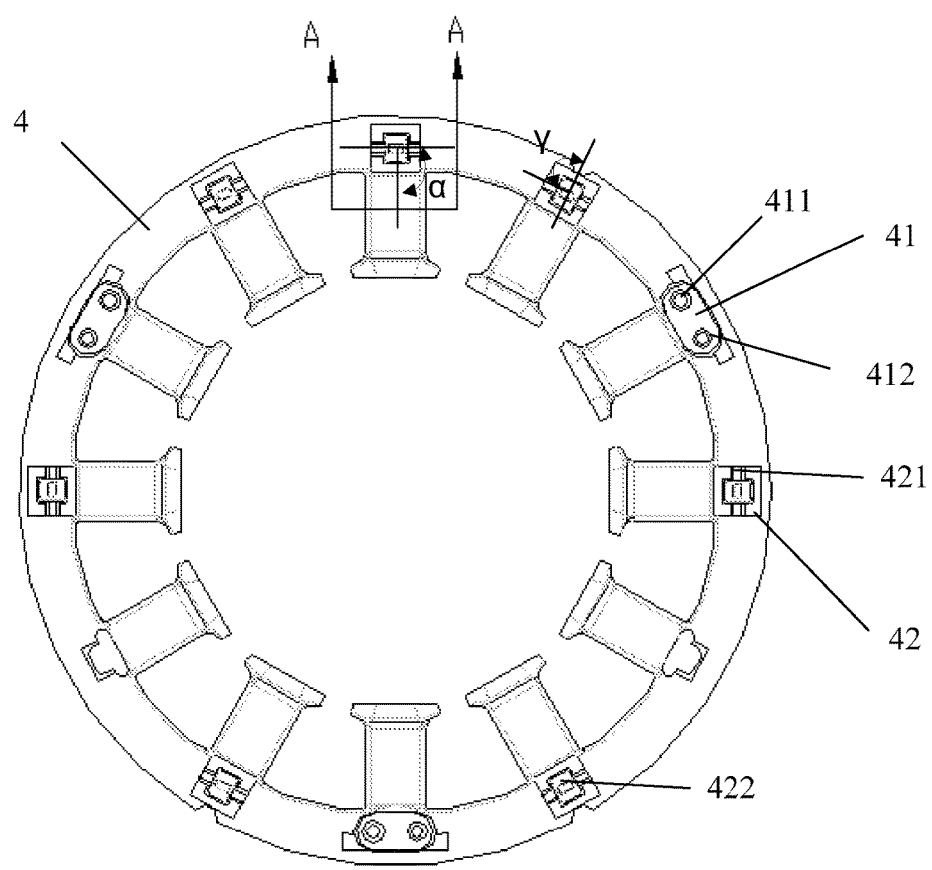
FIG. 2 is a top view showing the upper insulating bobbin according to the first example embodiment.
Figure 3:
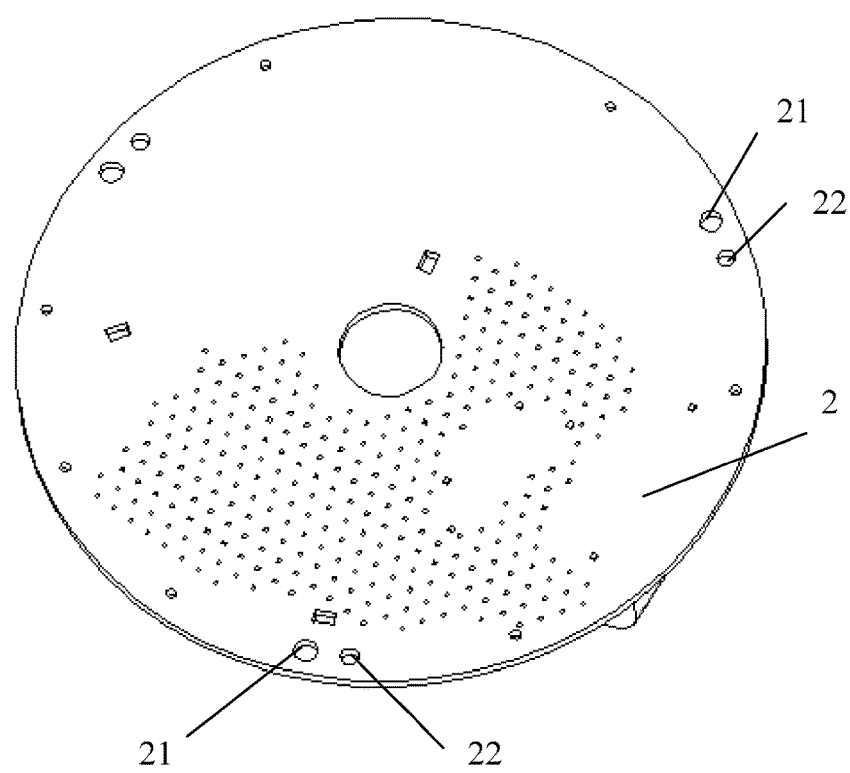
FIG. 3 is a bottom perspective view showing the PCB according to the first example embodiment.

FIGS. 1 and 2 are respectively perspective and top views showing the structure of the upper insulating bobbin according to a first example embodiment of the present invention. FIG. 3 is a bottom perspective view showing the printed circuit board (PCB) according to the first example embodiment. As will be described, a locating structure for a PCB and an upper insulating bobbin in a brushless motor may be provided.

With reference to FIGS. 1 and 3, the structure includes the upper insulating bobbin 4. The upper insulating bobbin 4 includes a plurality of locating bosses 41 that are evenly located along the circumference direction of the upper surface of the upper insulating bobbin 4. The top surface of the locating boss 41 is higher than the top surface of the terminal fixing block 42 with respect to the upper surface of the upper insulating bobbin 4 by an amount greater than zero. The terminal fixing block 42 is used for the insulation displacement connection (IDC) terminal installation (not shown).

A locating column 411 may be provided on the top surface of each locating boss 41. The end of the locating column 411 that works with the PCB 2 is tapered. Each locating boss 41 has the wire-through slot 413 for lead wire limiting on its side wall facing the outer edge of the upper insulating bobbin 4.

As shown in FIG. 2, the wire-through notch 421 on the terminal fixing block 42 is located along the circumference direction of the upper insulating bobbin 4. An angle α between the wire-through notch 421 and the radial direction of the circumference where its center is located may be 50°-130°. The terminal socket 422 on the terminal fixing block 42 is located along the radial direction of the upper insulating bobbin 4. The angle α between the terminal socket 422 and the tangent direction of the circumference where it is located may be 50°-130°.

In FIG. 2, a fixing hole 412 may be provided on the top surface of each locating boss 41.

As shown in FIG. 3, the structure may also include the PCB 2. The position on the PCB 2 to correspond with the locating column 411 of the upper insulating bobbin 4 may have a locating hole 21 to receive the locating column 411. The position on the PCB 2 to correspond with the fixing hole 412 of the upper insulating bobbin 4 may have a mounting hole 22 to align with the fixing hole 412. Here, the mounting holes 22 and the fixing holes 412 may be used to secure the PCB 2 with the upper insulating bobbin 4 using screws.

While not shown in FIGS. 1-3, the coil wound portion that is formed by the upper slot insulation 43 on the upper insulating bobbin 4, the tooth portion of the stator core and the lower slot insulation of the lower insulating bobbin may be wound by a lead wire after the upper insulating bobbin 4 and the lower insulating bobbin are assembled with the stator core to form a winding in a completed assembly. The electrical connection between the circuit on the PCB and the lead wire on the winding is achieved through terminals. The terminal may be an insulation displacement connection terminal. The end of the terminal may have a contact pin inserted into the terminal connecting hole on the PCB 2. Another end of the terminal may be inserted into the terminal fixing block 42 on the upper insulating bobbin 4 and punctures the insulation layer of the lead wire of the terminal fixing block 42 to realize continuity between the lead wire and the PCB 2.

According to the example embodiment of FIGS. 1-3, by optimizing the design of the height difference between the top surface of the locating boss 41 and the top surface of the terminal fixing block 42, damage to the PCB 2 can be prevented from the terminal going into the PCB 2 too deep but also prevent a discontinuity due to the terminal not going into the PCB 2 completely.

When the PCB 2 is assembled with the upper insulating bobbin 4, the locating column 411 on the locating boss 41 will work with the locating hole 21 on the PCB 2 first to reduce positional errors between the terminal connecting hole on the PCB 2 and the terminal on the upper insulating bobbin 4. Here, the end of the locating column 411 that is inserted into the locating hole 21 may be tapered so that position errors existing during the process of inserting the locating column 411 into the locating hole 21 can be automatically corrected. Automatic assembly of the PCB 2 and the upper insulating bobbin 4 may be facilitated, thereby improving production efficiency and reducing rejects during an automatic production process.

There may be many wire-through blocks for positioning a lead wire to be installed on the upper surface of the upper insulating bobbin 4 when the upper insulating bobbin 4 is wound by the lead wire. Each locating boss 41 has a wire-through slot 413 on its side wall facing the outer edge of the upper insulating bobbin 4 so that the locating boss 41 can position the lead wire as well. Further, the locating boss 41 can be used to replace some wire-through blocks so as to reduce the quantity of the wire-through blocks on the upper insulating bobbin 4, thereby simplifying the structure of the upper insulating bobbin 4 and reducing production cost.

After the PCB 2 and the upper insulating bobbin 4 has been assembled, the fixing hole 412 and the mounting hole 22 can be secured to prevent disconnection or looseness of the PCB 2 and the upper insulating bobbin 4, thereby improving stability of the brushless motor during operation. The fixing hole 412 and the mounting hole 22 can be secured by screws.

While it have been described to have the locating column 411 on the locating boss 41 and the locating hole on the PCB 2, they can be reversed in accordance with variations of the present invention.

According to the example embodiment of FIGS. 1-3, when the upper insulating bobbin is assembled with the PCB automatically, the locating column on the upper surface of the upper insulating bobbin and the locating hole on the PCB can be assembled first so as to realize accurate positioning between the terminal on the upper insulating bobbin and the terminal connecting hole on the PCB. Further, the positional errors between the terminal connecting hole on the PCB and the terminal on the upper insulating bobbin can be avoided. The quantity of rejects during automatic production can be reduced as well, thereby increasing yield. Further, the described configuration can prevent the circuit on the PCB from being damaged due to the terminal going into the PCB too deep while also preventing the circuit from discontinuity due to the terminal not go into the PCB completely by optimizing a height difference between the top surface of the locating boss and the top surface of the terminal fixing block. The end of the locating column to be inserted into the locating hole may tapered so that it can correct the positional errors during the process of inserting the locating column being into the locating hole, thereby ensuring accuracy of the locating column being inserted into the locating hole and further improving production efficiency. Each locating boss may have a wire-through slot for positioning a lead wire on its side wall facing the outer edge of the upper insulating bobbin so that it can reduce a number of the wire-through blocks on the upper insulating bobbin, thereby simplifying the structure of the upper insulating bobbin and reducing production cost. Moreover, the wire-through notch of the terminal fixing block on the upper insulating bobbin is located along the circumference direction of the upper insulating bobbin and the terminal socket on the terminal fixing block is located along the radial direction of the upper insulating bobbin. In this manner, the puncture notch of the insulation displacement connection terminal may be located along the circumference direction of the upper insulating bobbin so that the lead wire can be arranged along the circumference direction of the upper surface of the upper insulating bobbin when the stator winding is wound by the lead wire. Further, the radial dimension of the stator is reduced.

Second Embodiment

Figure 4:
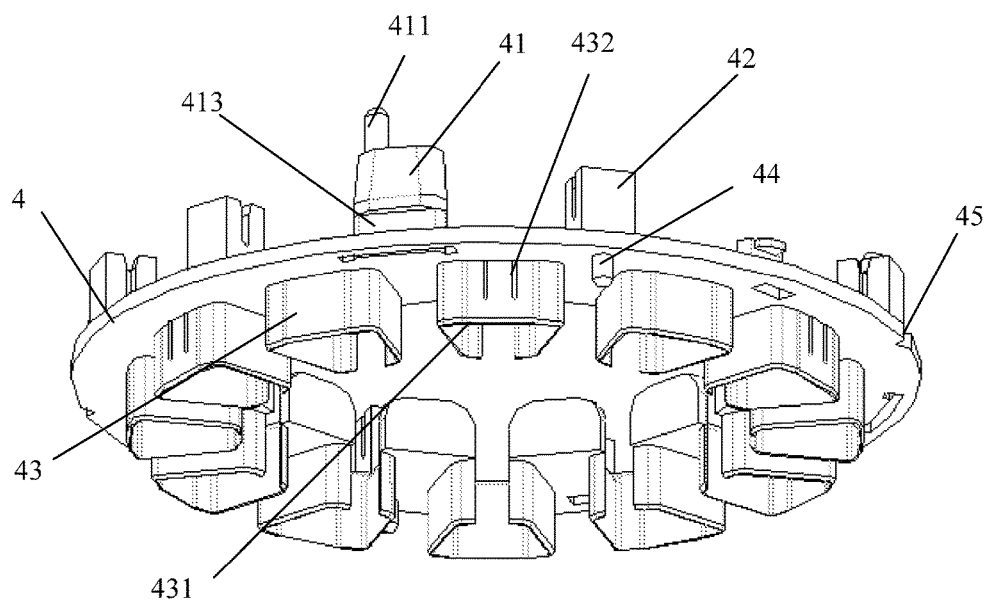
FIG. 4 is a perspective view showing the structure of the upper insulating bobbin according to a second example embodiment of the present invention.
Figure 5:
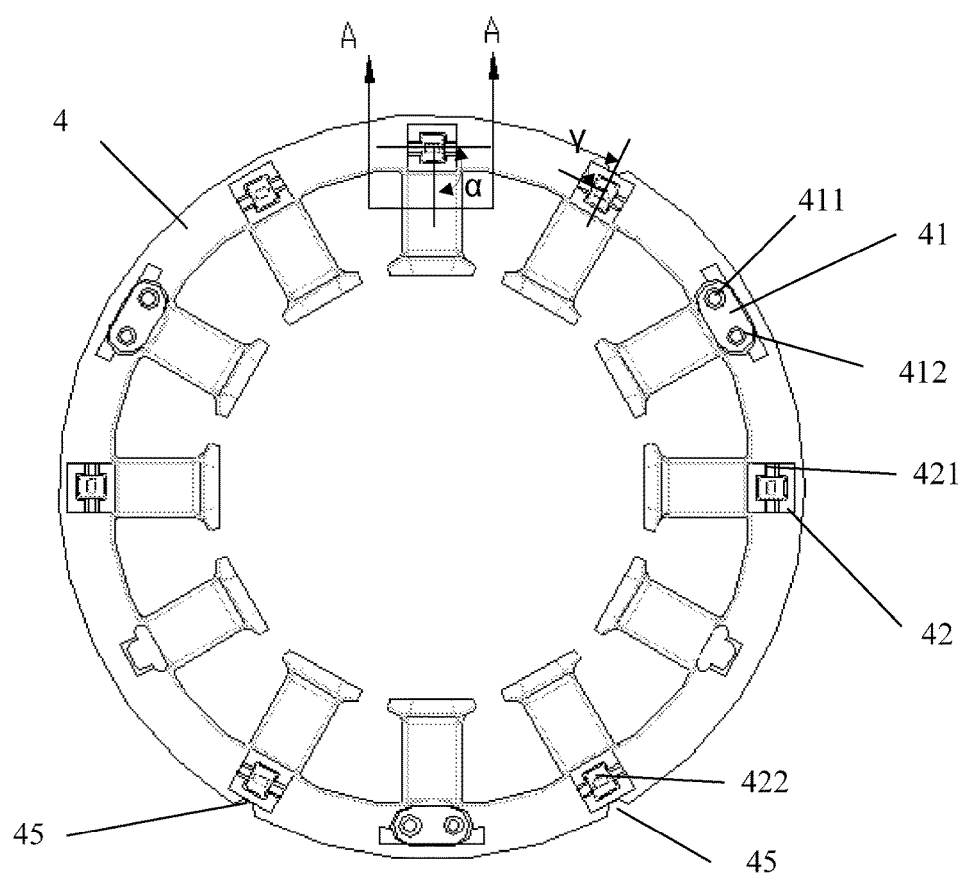
FIG. 5 is a top view showing the upper insulating bobbin according to the second example embodiment.

FIGS. 4 and 5 are respectively a perspective and top views showing the structure of the upper insulating bobbin according to a second example embodiment of the present invention. As will be described, a locating structure for a PCB and an upper insulating bobbin in a brushless motor may be provided.

According to FIG. 4, the structure includes the upper insulating bobbin 4. The upper insulating bobbin 4 includes a plurality of locating bosses 41 that are evenly located along the circumference direction of the upper surface of the upper insulating bobbin 4. The top surface of the locating boss 41 is higher than the top surface of the terminal fixing block 42 on the upper surface of the upper insulating bobbin 4 by an amount greater than zero. The terminal fixing block 42 is used for the insulation displacement connection (IDC) terminal installation (not shown).

A locating column 411 may be provided on the top surface of each locating boss 41. The end of the locating column 411 that works with the PCB 2 is tapered. Each locating boss 41 has the wire-through slot 413 for lead wire limiting on its side wall facing the outer edge of the upper insulating bobbin 4.

As shown in FIG. 5, the top surface of each locating boss 41 may have a fixing hole 412.

The structure may further include the PCB 2 as shown in FIG. 3. The position on the PCB 2 corresponding to the locating column 411 of the upper insulating bobbin 4 may have a locating hole 21 to receive the locating column 411. The position on the PCB 2 corresponding to the fixing hole 412 of the upper insulating bobbin 4 may have a mounting hole 22 to align with the fixing hole 412. Here, the mounting holes 22 and the fixing holds 412 may be used to secure the PCB 2 with the upper insulating bobbin using screws.

While not shown in FIGS. 4-5, the coil wound portion that is formed by the upper slot insulation 43 of the upper insulating bobbin 4, the tooth portion of the stator core and the upper slot insulation of the upper insulating bobbin may be wound by a lead wire after the upper insulating bobbin 4 and the lower insulating bobbin are assembled with the stator core to form a stator winding in a completed assembly. The electrical connection between the circuit of the PCB 2 and the lead wire of the stator winding may be completed by a terminal, which may be a insulation displacement connection terminal. One end of the terminal may have a contact pin inserted into the terminal connection hole on the PCB 2. Another end of the terminal may be inserted into the terminal fixing block 42 on the upper insulating bobbin, which punctures the insulation layer of the lead wire of the terminal fixing block 42 to realize continuity between the lead wire and the PCB 2.

Further, in accordance with this example embodiment, by optimizing the design of the height difference between the top surface of the locating boss 41 and the top surface of the terminal fixing block 42, damage to the PCB can be prevented from the terminal going into the PCB 2 too deep but also prevent a circuit discontinuity due to the terminal not going into the PCB 2 completely.

Moreover, when the PCB 2 is assembled with the upper insulating bobbin 4, the locating column 411 on the locating boss 41 will cooperate with the locating hole 21 on the PCB 2 first to reduce positional errors between the terminal connecting hole on the PCB 2 and the terminal on the upper insulating bobbin 4. Here, the end of the locating column 411 that is inserted into the locating hole 21 may be tapered so that position errors existing during the process of inserting the locating column 411 into the locating hole 21 can be automatically corrected. Automatic assembly of the PCB 2 and the upper insulating bobbin 4 may be facilitated, thereby improving production efficiency and reducing rejects during an automatic production process.

When the upper insulating bobbin 4 is wound with the lead wire, there are many wire-through blocks that need to be set on the upper surface of the upper insulating bobbin 4. Each locating boss 41 has the wire-through slot 413 on its side wall facing the outer edge of the upper insulating bobbin 4 to position the lead wire. Thus, the locating boss 41 can position the lead wire together with the wire-through blocks as well. Further, the locating boss 41 can replace some wire-through blocks. In this way, quantity of the wire-through block on the upper insulating bobbin 4 can be reduced, and the structure of the upper insulating bobbin 4 can be simplified and production cost can be reduced.

After the PCB 2 and the upper insulating bobbin 4 are assembled, the fixing hole 412 and the mounting hole 22 can be secured to prevent disconnection or looseness of the PCB 2 and the upper insulating bobbin 4, thereby improving stability of the brushless motor during operation. Here, the fixing hole 412 and the mounting hole 22 can be secured by screws.

Figure 6:
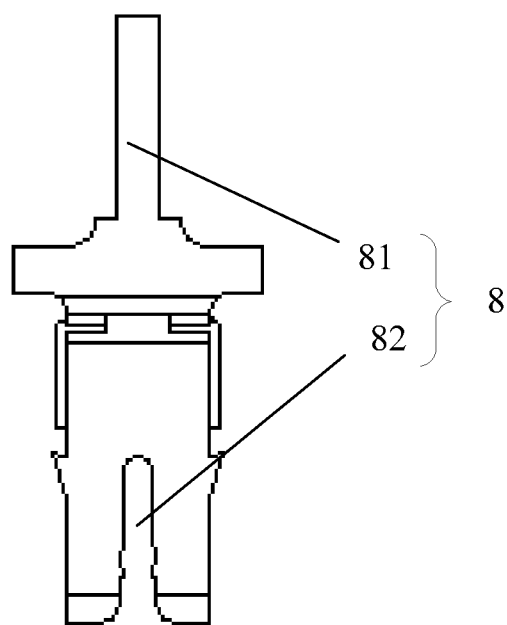
FIG. 6 is a diagram showing the structure of the MAG Mate Multispring terminal according to the second example embodiment.

FIG. 6 is a diagram showing the structure of the MAG Mate Multispring terminal that may be optionally used in accordance with the second example embodiment. In FIG. 6, the terminal fixing block 42 can be a MAG Mate Multispring terminal 8 installation and a height difference between a top surface of the locating boss 41 and the top surface of the terminal fixing block 42 can be 1-5 millimeters.

The end of the MAG Mate Multispring terminal 8 has a multi-spring contact pin 81 which is inserted into the terminal connecting hole on the PCB 2. Another end of the terminal 8 has the puncture notch 82 that is in the same direction as the wire-through notch 421. When the other end of the terminal 8 is inserted into the wire-through notch 421 of the terminal fixing block 42, the puncture notch 82 closes and the terminal 8 punctures the insulation layer of the lead wire to realize continuity between the lead wire and the PCB 2. The MAG Mate Multispring terminal 8 can realize electrical connection directly between the PCB 2 and the lead wire without pre-stripping wire and soldering. In this way, the production process simplified, thereby facilitating automatic production. To work with the MAG Mate Multispring terminal 8, height difference between a top surface of the locating boss 41 and the top surface of the terminal fixing block 42 can be 1-5 millimeters not only to prevent the circuit on the PCB 2 from being damaged due to the terminal going into the PCB 2 too deep but also to prevent the circuit discontinuity due to the terminal not going into the PCB 2 completely.

Optionally, according to FIG. 5, the wire-through notch 421 on the terminal fixing block 42 may be located along the circumference direction of the upper insulating bobbin 4. The angle α between the wire-through notch 421 and the radial direction of the circumference where its center is located may be 50°-130°. The terminal socket 422 on the terminal fixing block 42 is located along the radial direction of the upper insulating bobbin 4. The angle γ between the terminal socket 422 and the tangent direction of the circumference where it is located may be 50°-130°.

While not shown in FIGS. 4 and 5, the terminal fixing block 42 on a related art upper insulating bobbin 4 may be located along the radial direction of the upper insulating bobbin 4 and the terminal socket 422 on the terminal fixing block 42 is along the circumference direction of the upper insulating bobbin 4 so the puncture notch of the insulation displacement connection terminal is located along the radial direction of the upper insulating bobbin during the forming process of the stator winding. In this way, the lead wire may be routed out along the radial direction of the upper insulating bobbin 4 when the stator winding is wound by the lead wire so the radial dimension of the stator is increased. However, according to the embodiment, the wire-through notch 421 of the terminal fixing block 42 on the upper insulating bobbin 4 is located along the circumference direction of the upper insulating bobbin 4 and the terminal socket 422 on the terminal fixing block 42 is located along the radial direction of the upper insulating bobbin 4. In this way, when the MAG Mate Multispring terminal 8 is used, the puncture notch 82 of the MAG Mate Multispring terminal 8 is located along the circumference direction of the upper insulating bobbin 4 so that the radial dimension of the stator is reduced.

Optionally, according to FIG. 4, there may be an error proofing slope 431 at the lower end of the upper slot insulation 43 on the upper insulating bobbin 4. The error proofing slope 431 is back towards the centre of the upper insulating bobbin 4.

The lower end of the upper slot insulation 43 may be inserted into the stator core when the upper insulating bobbin 4 is assembled with the stator core. However, there may be deviation when the upper slot insulation 43 is inserted into the stator core due to dimension error and assembly error during product manufacturing process so the success rate of inserting is not high. According to example embodiments, the error proofing slope 431 may be provided at one end of the upper slot insulation 43 to be inserted into the stator core so that the upper slot insulation 43 can correct positional errors when it is inserted into the stator core. In this way, the success rate of inserting is improved, thereby further improving the efficiency of the automatic assembly.

Figure 7:
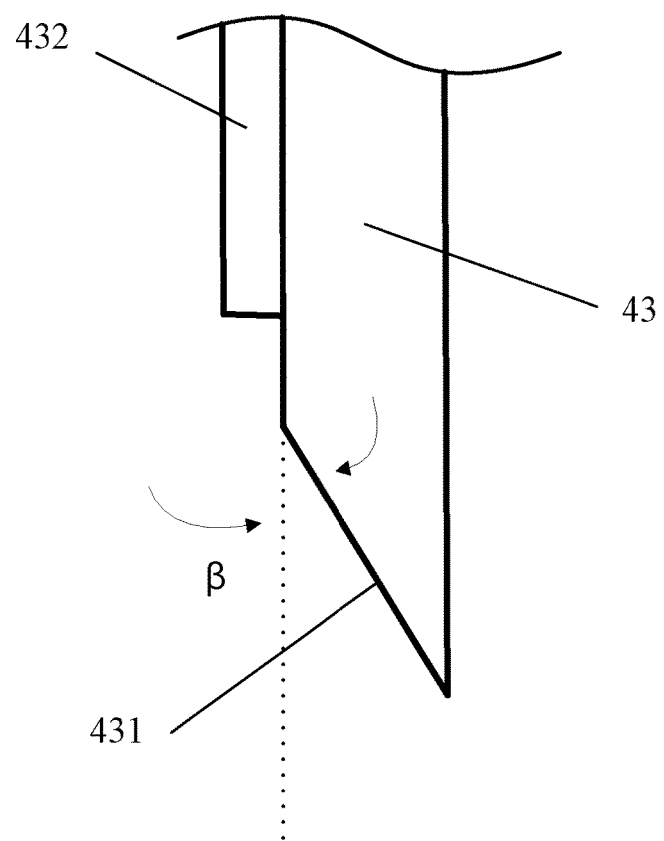
FIG. 7 is a diagram showing the local structure of the upper slot insulation of the upper insulating bobbin according to the second example embodiment.

FIG. 7 is a diagram showing the local structure of the upper slot insulation of the upper insulating bobbin according to the second example embodiment. In FIG. 7, the angle β between the error proofing slope 431 and the plane where the outer side of the upper slot insulation 43 is located is 10°-60°.

According to the embodiment, it can improve the working efficiency of the error proofing slope 431 and further improve the success rate of inserting by optimizing design of the angle β between the error proofing slope 431 and the plane where the outer side of the upper slot insulation 43 is located.

Optionally, as shown in FIGS. 4 and 7, there is at least one anti-slip rib 432 at the outer side of the lower end of the upper slot insulation 43 on the upper insulating bobbin 4.

According to this example embodiment, disconnection or looseness between the upper slot insulation 43 and the stator core can be prevented after they are assembled by setting anti-slip ribs 432, thereby improving stability of the stator winding structure. Here, the anti-slip rib 432 is located vertically along the outer side of the upper slot insulation 43. The anti-slip rib 432 facilitates a stronger assembly between the upper slot insulation 43 and the stator core by utilizing the anti-slip rib 432.

Optionally, as shown in FIG. 4, there is at least one anti-slip column 44 along the circumference direction of the lower surface of the upper insulating bobbin 4. The anti-slip column 44 is perpendicular to the lower surface of the upper insulating bobbin 4. Here, the interference fit between the anti-slip column 44 and the stator core further prevents looseness between the assembled upper insulating bobbin 4 and the stator core.

Optionally, according to FIG. 4, a plurality of recesses 45 may be provided on the side wall of the upper insulating bobbin 4. Here, the plurality of recesses 45 on the side wall of the upper insulating bobbin 4 as a further safeguard to prevent the upper insulating bobbin 4 from being assembled reversely with the stator core. The plurality of recess 45 may be distributed unevenly on the side wall of the upper insulating bobbin 4. For example, three recesses 45 can be used with two being located symmetrically on the side wall of the upper insulating bobbin 4 and the third being closer to one of the previous two recesses. By this asymmetry, the recesses 45 can safeguard against the upper insulating bobbin 4 being installed reversely.

In accordance with the second example embodiment, when the upper insulating bobbin is assembled with the PCB, accurate positioning between the terminal on the upper insulating bobbin and the terminal connecting hole on the PCB can be realized by firstly assembling the locating column on the upper surface of the upper insulating bobbin with the locating hole on the PCB. In this manner, positional errors between the terminal connecting hole on the PCB and the terminal on the upper insulating bobbin may be reduced. The frequency of rejects during automatic production may therefore be reduced. In addition, the circuit on the PCB can be protected from damaged due to the terminal going into the PCB too deep but also can prevent the circuit disconti- nuity due to the terminal not going into the PCB completely by optimizing a height difference between the top surface of the locating boss and the top surface of the terminal fixing block. The end of the locating column that works with the locating hole may be tapered so that the position errors during the process of the locating column being inserted into the locating hole can be corrected and accuracy of the locating column being inserted into the locating hole can be ensured, thereby improving production efficiency. Each locating boss may have a wire-through slot for positioning a lead wire on its side wall facing the outer edge of the upper insulating bobbin to reduce a number of the wire-through block on the upper insulating bobbin, thereby simplifying the structure of the upper insulating bobbin and reducing production cost.

Third Embodiment

Figure 8:
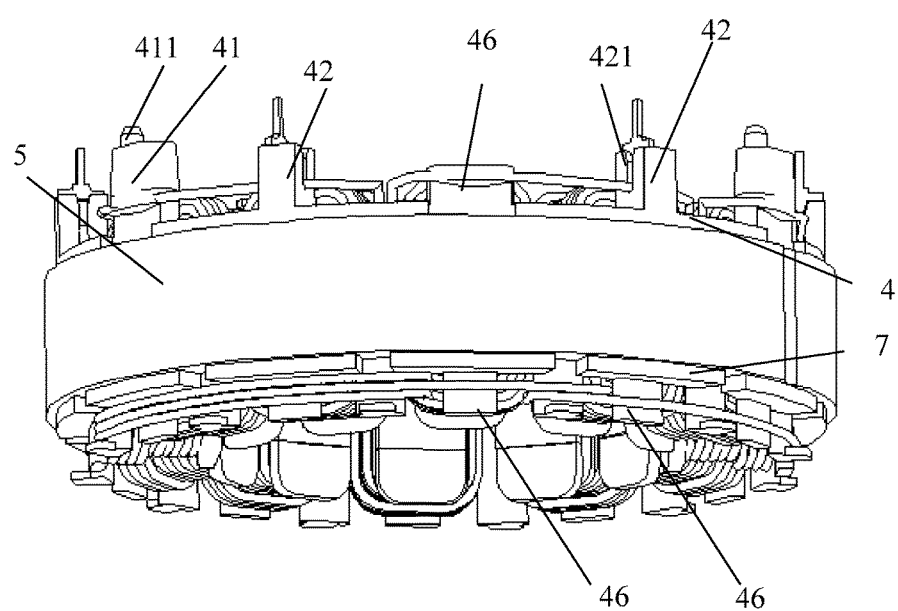
FIG. 8 is a perspective view showing the structure of the stator with the insulating bobbin according to a third example embodiment.
Figure 9:
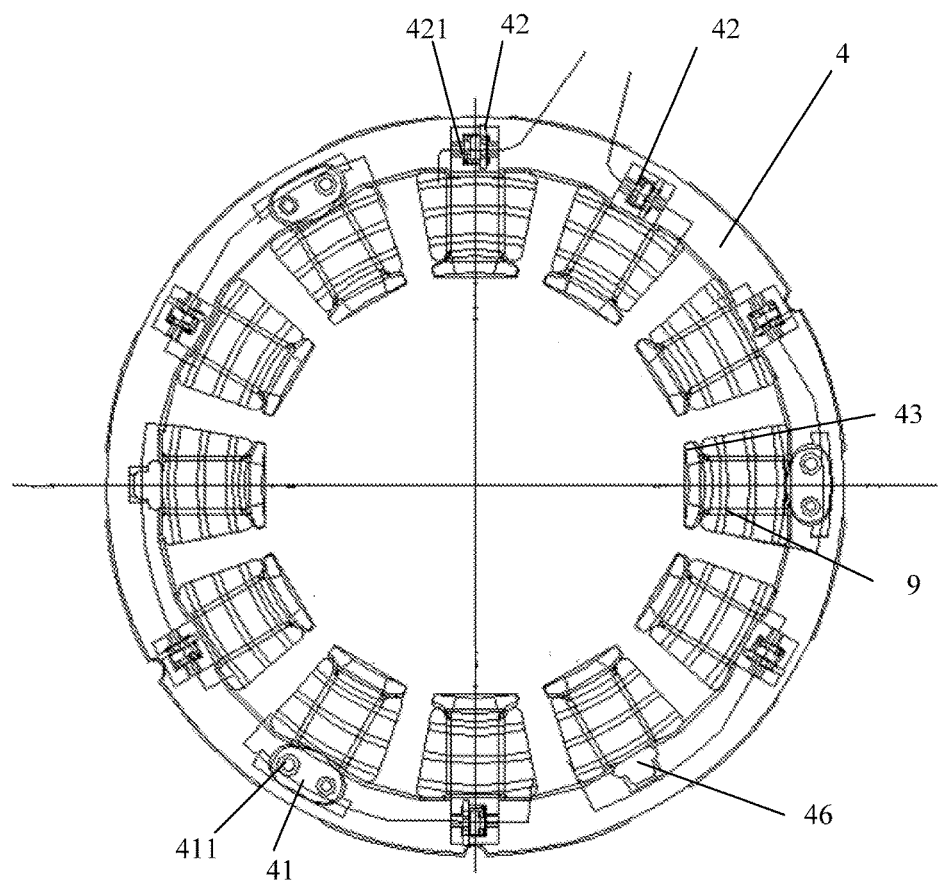
FIG. 9 is a top view showing the stator with the insulating bobbin according to the third example embodiment.
Figure 10:
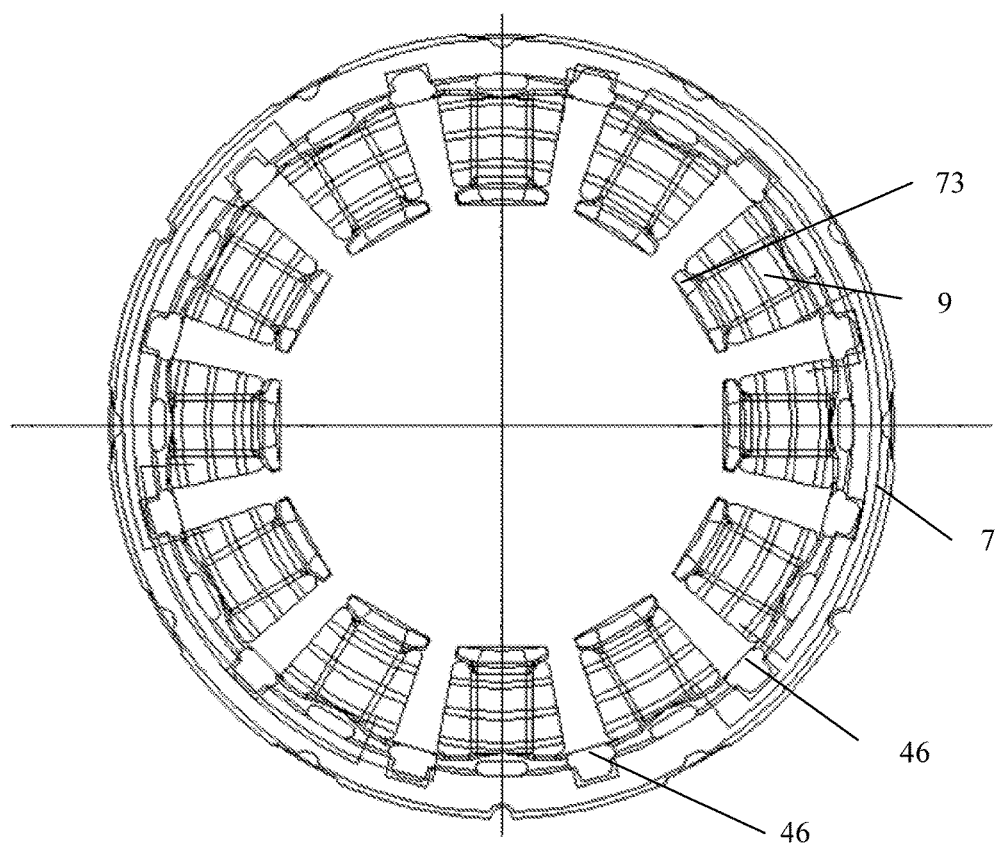
FIG. 10 is a bottom view showing the stator with the insulating bobbin according to the third example embodiment.
Figure 11:
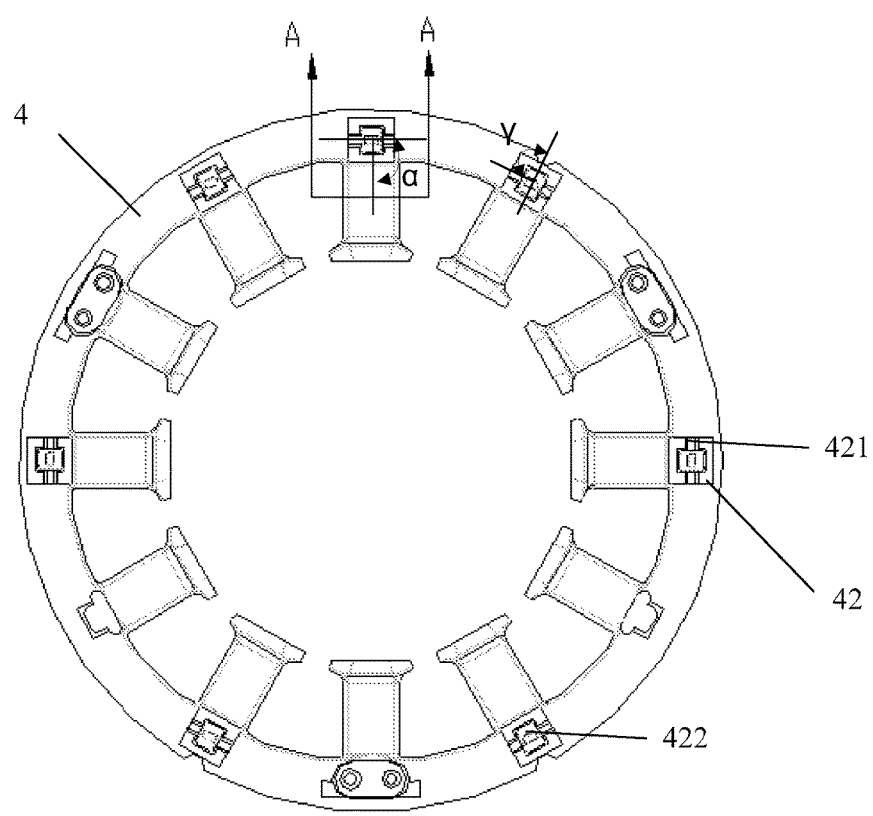
FIG. 11 is a top view showing the upper insulating bobbin according to the third example embodiment of the invention.
Figure 12:
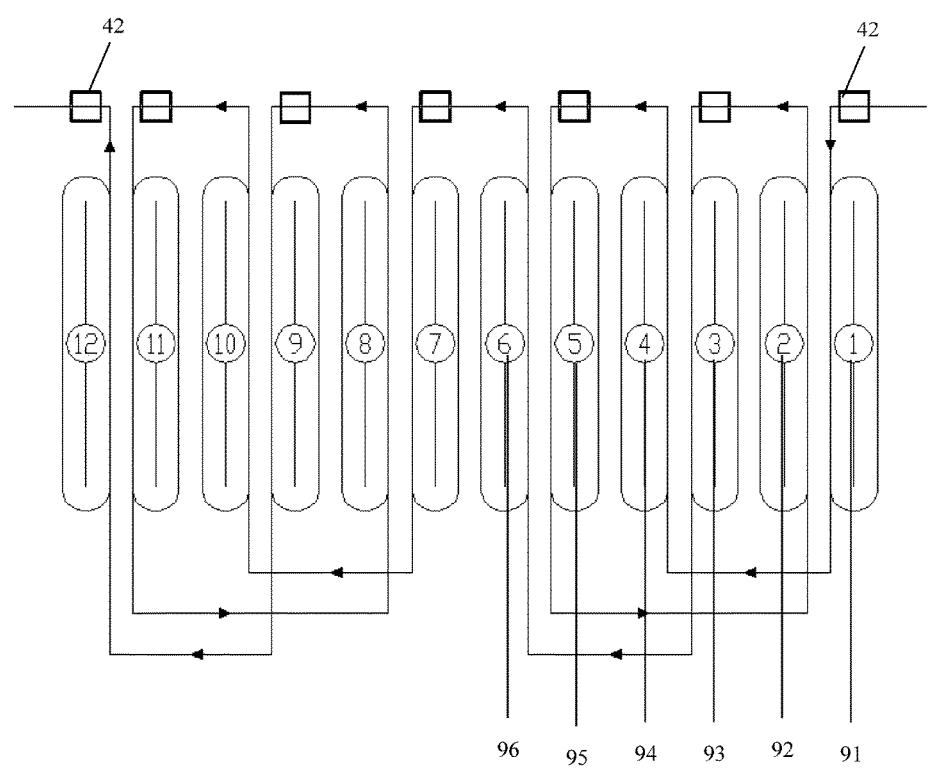
FIG. 12 is a diagram showing the wire winding structure of the stator winding according to the third example embodiment.

FIGS. 8-10 are perspective, top, and bottom views, respectively, showing the structure of the stator with the insulating bobbin according to a third example embodiment. FIG. 11 is a top view showing the upper insulating bobbin according to the third example embodiment of the invention. FIG. 12 is a diagram showing the wire winding structure of the winding according to the third example embodiment. In accordance with the third example embodiment, a locating structure for assembling a PCB and an upper insulating bobbin are provided. The structure of the upper insulating bobbin is exemplary and can be used with a stator and/or an insulating bobbin of other structures.

According to FIG. 8, the stator with the insulating bobbin includes the stator core 5. The stator core 5 has the upper insulating bobbin 4 and the lower insulating bobbin 7 installed on its upper and lower end faces. A plurality of terminal fixing blocks 42 and a plurality of wire-through blocks 46 may be provided on the upper surface of the upper insulating bobbin 4. A plurality of wire-through blocks 46 may be provided on the lower surface of the lower insulating bobbin 7.

As shown in FIGS. 9 and 10, the coil wound portion 9 is formed by the upper slot insulation 43 on the upper insu- lating bobbin 4, the tooth portion (not shown) of the stator core 5, and the lower slot insulation 73 of the lower insulating bobbin 7.

As shown in FIG. 11, the wire-through notch 421 of the terminal fixing block 42 is located along the circumference direction of the upper insulating bobbin 4. The angle α between the wire-through notch 421 and the radial direction of the circumference where its center is located is 50°-130°. The terminal socket 422 on the terminal fixing block 42 is located along the radial direction of the upper insulating bobbin 4. The angle α between the terminal socket 422 and the tangent direction of the circumference where it is located is 50°-130°

As shown in FIG. 12, there is at least one group of the coil wound portion 9 on the stator core 5. Each group of coil wound portion 9 includes the first coil wound portion 91, the second coil wound portion 92, the third coil wound portion 93, the fourth coil wound portion 94, the fifth coil wound portion 95, and the sixth coil wound portion 96. A single piece of lead wire may be routed into the upper part of the first coil wound portion 91 and finishes winding the first coil wound portion 91. Then, the lead wire may be is routed out of the lower part of the first coil wound portion 91 and into the lower part of the fourth coil wound portion 94. After finishing winding the fourth coil wound portion 94, the lead wire may be routed out of the upper part of the fourth coil wound portion 94 and into the upper part of the fifth coil wound portion 95. After finishing winding the fifth coil wound portion 95, the lead wire may be routed out of the lower part of the fifth coil wound portion 95 and into the lower part of the second coil wound portion 92. After finishing winding the second coil wound portion 92, the lead wire may be routed out of the upper part of the second coil wound portion 92 and into the upper part of the third coil wound portion 93. After finishing winding the third coil wound portion 93, the lead wire may be routed out of the lower part of the third coil wound portion 93 and into the lower part of the sixth coil wound portion 96. After finishing winding the sixth coil wound portion 96, the lead wire may be routed out of the upper part of the sixth coil wound portion 96. Here, the coil wound portions 9 of two adjacent groups are connected by their upper parts.

According to the embodiment, the coil wound portions 9 of adjacent groups are connected by their upper parts, which means the lead wire that is routed out of the upper part of the sixth coil wound portion of one group coil wound portion 9 is routed into the upper part of the first coil wound portion 91 of the group coil wound portion 9 which is adjacent to the group coil wound portion 9. For example, in FIG. 12, the coil wound portion 9 which is marked 1-6 is one group of coil wound portion 9. (The first coil wound portion 91 is marked 1. The second coil wound portion 92 is marked 2 and so on.) Another group of coil wound portions 9 in FIG. 12 is marked 7-12. (The first coil wound portion 91 of this group is marked 7. The second coil wound portion 92 is marked 8 and so on.) According to the embodiment of FIG. 12, after the group of coil wound portions 9 which is marked 1-6 is wound as per the method mentioned above, the lead wire is routed out of the upper part of the sixth coil wound portion 96 which is marked 6 and routed into the upper part of the first coil wound portion 91 which is marked 7.

The coil wound portion 9 of the stator may be wound as per the method mentioned above. As such, all coils of the stator winding can be wound by a same piece of lead wire so as to reduce the winding operations. Moreover, two adjacent coil wound portions 9 can share one terminal fixing block 42 so that quantity of the terminal can be reduced. Further, the lead wire is routed into or routed out of the upper and the lower parts of the coil wound portion 9. That is, the lead wire is routed from two faces so that the space at two ends of the stator can be best utilized and the internal space of the brushless motor is properly used, thereby permitting convenient arrangement of other components.

The terminal fixing block 42 on the upper insulating bobbin 4 may be located along the radial direction of the upper insulating bobbin 4 and the terminal socket 422 on the terminal fixing block 42 may be located along the circumference direction of the upper insulating bobbin 4 during the forming process of related art winding design so the puncture notch of the insulation displacement connection terminal is located along the radial direction of the upper insulating bobbin. In this manner, the lead wire is routed out along the radial direction of the insulating bobbin 4 when the stator winding is wound by the lead wire so that the radial dimension of the stator is increased. However, according to this example embodiment, the wire-through notch 421 of the terminal fixing block 42 on the upper insulating bobbin 4 is located along the circumference direction of the upper insulating bobbin 4 and the terminal socket 422 on the terminal fixing block 42 is located along the radial direction of the upper insulating bobbin 4. In this manner, the puncture notch 82 of the insulating displacement connection terminal 8 is located along the circumference direction of the upper insulating bobbin 4 so that the lead wire can be located along the circumference direction of the upper surface of the upper insulating bobbin 4 when the winding is wound by the lead wire to reduce the radial dimension of the stator.

The structure of the upper insulating bobbin of the stator with the insulating bobbin is substantially the same as that described above so it will not be described further here.

According to the third example embodiment, accurate positioning between the terminal on the upper insulating bobbin and the terminal connecting hole on the PCB can be realized by assembling the locating column on the upper surface of the upper insulating bobbin and the locating hole on the PCB when the upper insulating bobbin is assembled automatically with the PCB to reduce the errors of positions between the terminal connecting hole on the PCB and the terminal on the upper insulating bobbin and reduce quantity of rejects during automatic production. This configuration can prevent the circuit on the PCB from being damaged due to the terminal going into the PCB too deep and also prevent the circuit discontinuity due to the terminal not going into the PCB completely. The end of the locating column that works with the locating hole may tapered to correct positional errors during the process of the locating column being inserted into the locating hole and ensure the accuracy of the locating column being inserted into the locating hole, thereby improving production efficiency. Each locating boss may have a wire-through slot for lead wire limiting on its side wall facing the outer edge of the upper insulating bobbin so that a number of the wire-through blocks on the upper insulating bobbin can be reduced and the structure of the upper insulating bobbin can be simplified, thereby lowering production cost. The coil wound portion of the stator may be wound as per the method mentioned above. As such, all of the coils of the stator winding can be wound by a same piece of lead wire, thereby reducing the winding operations. Moreover, two adjacent coil wound portions can share one terminal fixing block, thereby reducing the number of terminals. Further, the lead wire is routed into or routed out of the upper and the lower parts of the coil wound portion. That is, the lead wire is routed from two faces so that the space at two ends of the stator can be best utilized and the internal space of the brushless motor can be properly used, thereby permitting convenient arrangement of other components.

The sequence numbers of the embodiment of the invention described above are for description and explanatory purposes only and can be varied in accordance with design or manufacturing needs in accordance with variations of the present invention.

It will be apparent to those skilled in the art that various modifications and variations can be made in the brushless motor of the present invention without departing from the spirit or scope of the invention. Thus, it is intended that the present invention cover the modifications and variations of this invention provided they come within the scope of the appended claims and their equivalents.

What is claimed is:
1. A brushless motor, comprising:
a printed circuit board having a plurality of locating holes therethrough; and
an upper insulating bobbin including a plurality of locating bosses and a plurality of terminal fixing blocks distributed along a circumference direction of an upper surface of the upper insulating bobbin,
wherein each locating boss has a locating column projecting from a top surface thereof such that each locating column is inserted into a respective locating hole, and
wherein the top surfaces of the locating bosses are higher than top surfaces of the terminal fixing blocks with respect to the upper surface of the upper insulating bobbin.

2. The brushless motor according to claim 1, wherein the locating bosses and the terminal fixing blocks are distributed evenly along the circumference direction of the upper insulating bobbin.

3. The brushless motor according to claim 1, wherein each locating boss further includes a fixing hole and the printed circuit board includes a plurality of mounting holes each at a position corresponding to a respective one of the mounting holes.

4. The brushless motor according to claim 1, wherein the terminal fixing blocks are used for insulation displacement connection terminal installation.

5. The brushless motor according to claim 1, wherein each locating boss defines a wire-through slot on its side wall facing an outer edge of the upper insulating bobbin configured to position a lead wire.

6. The brushless motor according to claim 5, wherein each terminal fixing block defines a wire-through notch on its top surface configured to position the lead wire,
wherein a first angle between the wire-through notch and the radial direction of the upper insulating bobbin is 50°-130°, and wherein a second angle between a terminal socket on the terminal fixing block and a tangential direction of the upper insulating bobbin is 50°-130°.

7. The brushless motor according to claim 6, wherein the first and second angles are each 90°.

8. The brushless motor according to claim 1, wherein each terminal fixing block is a MAG Mate Multispring terminal installation, and wherein a height difference between the top surfaces of the locating bosses is higher than the top surfaces of the terminal fixing blocks with respect to the upper surface of the upper insulating bobbin by 1-5 millimeters.

9. The brushless motor according to claim 1, wherein a bottom surface of the upper insulating bobbin includes a plurality of upper slot insulation portions configured to receive a corresponding portion of a stator, a lower end surface of the upper slot insulation portion being sloped to correct positional errors when mounted with the stator.

10. The brushless motor according to claim 9, wherein the lower end surface of the upper slot insulation portion is sloped toward a center of the upper insulating bobbin.

11. The brushless motor according to claim 10, wherein an angle of the slope is 10°-60°.

12. The brushless motor according to claim 9, wherein at least one upper slot insulation portion includes an anti-slip rib on an outer side of the upper slot insulation portion.

13. The brushless motor according to claim 12, wherein the anti-slip rib is located vertically along the outer side of the upper slot insulation portion.

14. The brushless motor according to claim 1, wherein a bottom surface of the upper insulating bobbin includes at least one anti-slip column projecting therefrom.

15. The brushless motor according to claim 1, wherein an edge of the upper insulating bobbin includes a plurality of recesses configured to ensure an orientation of the upper insulating bobbin relative to a stator when being mounted with the stator, the recesses being positioned asymmetrically around the edge of the upper insulating bobbin.

16. A brushless motor, comprising:
a printed circuit board; and
an upper insulating bobbin including a plurality of locating bosses and a plurality of terminal fixing blocks distributed along a circumference direction of an upper surface of the upper insulating bobbin,
wherein the top surfaces of the locating bosses are higher than top surfaces of the terminal fixing blocks with respect to the upper surface of the upper insulating bobbin,
wherein one of the printed circuit board and the plurality of locating bosses includes a plurality of locating columns respectfully projecting therefrom,
wherein the other one of the printed circuit board and the plurality of locating bosses includes a plurality of locating holes, and
wherein each locating column is inserted into a respective locating hole.

17. The brushless motor according to claim 16, wherein each locating boss further includes a fixing hole and the printed circuit board includes a plurality of mounting holes each at a position corresponding to a respective one of the mounting holes.

18. The brushless motor according to claim 16, wherein the locating bosses and the terminal fixing blocks are distributed evenly along the circumference direction of the upper insulating bobbin,
wherein each locating boss defines a wire-through slot on its side wall facing an outer edge of the upper insulating bobbin configured to position a lead wire, and
wherein each terminal fixing block defines a wire-through notch on its top surface configured to position the lead wire.

19. A brushless motor, comprising:
a printed circuit board; and
an upper insulating bobbin including a plurality of locating bosses distributed along a circumference direction of an upper surface of the upper insulating bobbin,
wherein one of the printed circuit board and the plurality of locating bosses includes a plurality of locating columns respectfully projecting therefrom,
wherein the other one of the printed circuit board and the plurality of locating bosses includes a plurality of locating holes,
wherein each locating column is inserted into a respective locating hole, and
wherein each locating boss further includes a fixing hole and the printed circuit board includes a plurality of mounting holes each at a position corresponding to a respective one of the mounting holes.

20. A brushless motor, comprising:
a printed circuit board; and
an upper insulating bobbin including a plurality of locating bosses distributed along a circumference direction of an upper surface of the upper insulating bobbin,
wherein one of the printed circuit board and the plurality of locating bosses includes a plurality of locating columns respectfully projecting therefrom,
wherein the other one of the printed circuit board and the plurality of locating bosses includes a plurality of locating holes,
wherein each locating column is inserted into a respective locating hole, and
wherein a bottom surface of the upper insulating bobbin includes a plurality of upper slot insulation portions configured to receive a corresponding portion of a stator, a lower end surface of the upper slot insulation portion being sloped to correct positional errors when mounted with the stator.

* * * * *